US008033264B2

(12) United States Patent  
Lauter

(10) Patent No.: US 8,033,264 B2
(45) Date of Patent: Oct. 11, 2011

(54) ROTARY ENGINE

(75) Inventor: Jonathan Lauter, Great Neck, NY (US)

(73) Assignee: Rotary Power LLC, Glen Cove, NY (US)

( * ) Notice: Subject to any disclaimer, the term of this patent is extended or adjusted under 35 U.S.C. 154(b) by 745 days.

(21) Appl. No.: 12/045,010

(22) Filed: Mar. 9, 2008

(65) Prior Publication Data

US 2009/0250036 A1 Oct. 8, 2009

(51) Int. Cl.
*F02B 53/12* (2006.01)
*F01C 1/02* (2006.01)
*F01C 21/00* (2006.01)
*F04C 18/00* (2006.01)
*F04C 2/00* (2006.01)
*F04C 15/00* (2006.01)
*F04C 29/00* (2006.01)

(52) U.S. Cl. ....... 123/211; 123/210; 418/61.2; 418/178; 418/179

(58) Field of Classification Search .......... 123/200–205, 123/210, 211; 418/61.2, 101, 178–179
See application file for complete search history.

(56) References Cited

U.S. PATENT DOCUMENTS

| 2,555,080 | A | * | 5/1951 | Goddard | 60/258 |
|---|---|---|---|---|---|
| 3,234,922 | A | * | 2/1966 | Froede | 418/101 |
| 3,289,647 | A | * | 12/1966 | Turner et al. | 418/61.2 |
| 3,359,615 | A | * | 12/1967 | Bauer | 418/178 |
| 3,512,907 | A | * | 5/1970 | Belzner | 123/210 |
| 3,561,894 | A | * | 2/1971 | King | 418/61.2 |
| 3,588,296 | A | * | 6/1971 | Toyama | 418/61.2 |
| 3,812,827 | A | * | 5/1974 | Linn | 123/211 |
| 3,888,606 | A | * | 6/1975 | Uy | 418/179 |
| 3,895,889 | A | * | 7/1975 | Loyd et al. | 418/83 |
| 3,920,360 | A | * | 11/1975 | Bierlein | 418/178 |
| 3,937,185 | A | * | 2/1976 | Dixon et al. | 123/211 |
| 4,037,998 | A | * | 7/1977 | Goloff | 418/178 |
| 4,044,589 | A | * | 8/1977 | Waimsley et al. | 29/888.012 |
| 4,050,132 | A | * | 9/1977 | Wieland | 29/888.012 |
| 5,362,219 | A | * | 11/1994 | Paul et al. | 418/61.2 |
| 6,162,034 | A | * | 12/2000 | Mallen | 418/178 |
| 6,892,692 | B2 | * | 5/2005 | Barrett | 418/61.2 |
| 2009/0314005 | A1 | * | 12/2009 | Messmer | 60/792 |

FOREIGN PATENT DOCUMENTS

JP 59119045 A * 7/1984
JP 03281936 A * 12/1991

* cited by examiner

*Primary Examiner* — Thai Ba Trieu

(57) ABSTRACT

A lightweight rotary engine is provided that comprises a structurally efficient, lightweight rotor housing. Disposed in the wall of the rotor housing is a combustion zone thermal barrier insert. The thermal barrier insert is comprised of a material with low thermal conductivity. The use of the insert allows the rotor housing to be constructed from higher strength material such as steel or titanium.

11 Claims, 5 Drawing Sheets

Compression Stroke
PRIOR ART

Intake Stroke
PRIOR ART

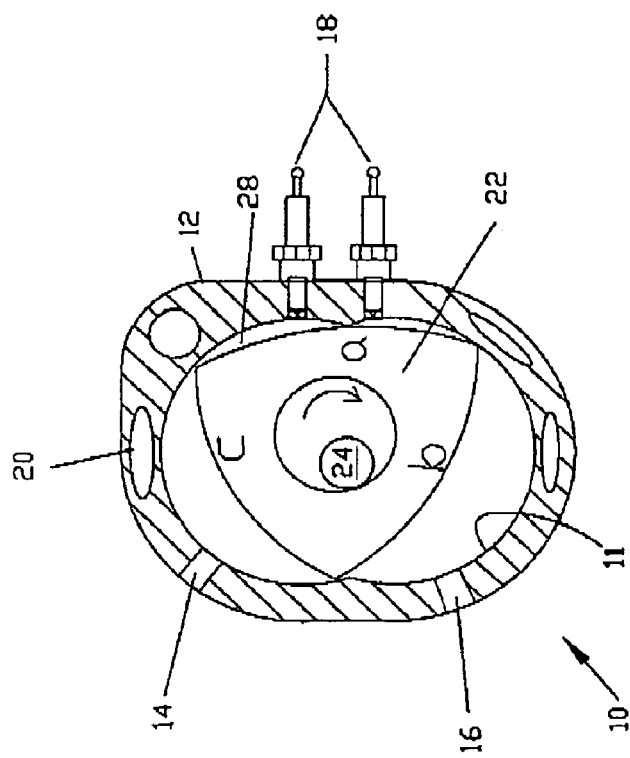
FIG. 1C Ignition PRIOR ART
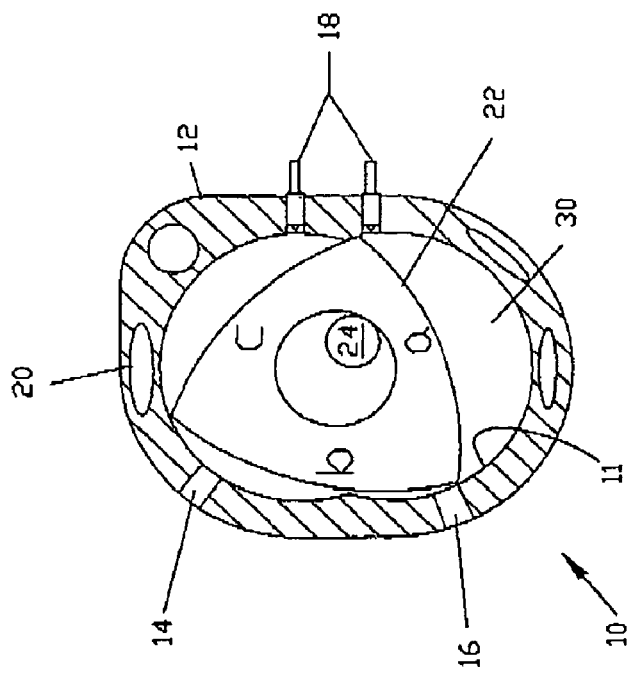
FIG. 1D Combustion PRIOR ART

ROTARY ENGINE

BACKGROUND OF THE INVENTION

This invention relates to a Wankel type rotary engine and more specifically relates to an improved rotary engine which exhibits superior thermal performance which may result in a lightweight, more efficient rotary engine.

The Wankel rotary engine is a type of internal combustion engine, invented by German engineer Felix Wankel, which uses a rotor instead of reciprocating pistons. This design delivers smooth high-rpm power from a compact, lightweight engine.

Referring to FIGS. 1A through 1D, in the Wankel engine 10, the four strokes of a typical Otto cycle occur in the space between a rotor 22, which is roughly triangular, having faces denoted 'a', 'b' and 'c', and the inside of a rotor housing 12. In the basic single-rotor Wankel engine, the oval-like epitrochoid-shaped inner surface 11 surrounds the three-sided rotor 22. Due to thermal requirements of the housing 12, most housings of the prior art are made from heavy sections of high strength aluminum. This typically results in a large, heavy and structurally inefficient housing 12. The central drive shaft 24, also called an eccentric shaft or E-shaft, passes through the center of the rotor and is supported by bearings (not shown). The rotor 22 both rotates around an offset lobe (crank) on the shaft 24 and makes orbital revolutions around the shaft 24. Apex seals 15 at the corners of the rotor 22 seal against the inner surface 11 of the housing, dividing it into three moving combustion chambers. As the rotor 22 rotates and orbitally revolves, each face 'a', 'b', and 'c' of the rotor 22 gets closer and farther from the surface 11 of the housing, compressing and expanding the combustion chamber similarly to the strokes of a piston in a reciprocating engine. The power vector of the combustion stage goes through the center of the offset lobe.

While a four-stroke piston engine makes one combustion stroke per cylinder for every two rotations of the crankshaft (that is, one half power stroke per crankshaft rotation per cylinder), each combustion chamber in the Wankel rotary engine generates one combustion stroke per each driveshaft rotation, i.e. one power stroke per rotor orbital revolution and three power strokes per rotor rotation. Thus, power output of a Wankel engine is generally higher than that of a four-stroke piston engine of similar engine displacement in a similar state of tune and higher than that of a four-stroke piston engine of similar physical dimensions and weight. Wankel engines also generally can operate at a higher RPM than a reciprocating engine of similar size since the strokes are completed with a rotary motion as opposed to a reciprocating engine which must use connecting rods and a crankshaft to convert reciprocating motion into rotary motion.

One well known drawback associated with the Wankel rotary engine is due to the fact that unlike a piston engine, where the cylinder is cooled by the incoming charge after being heated by combustion, Wankel rotor housings are constantly heated on one side and cooled on the other, leading to high local temperatures and unequal thermal expansion. This places high demands on the materials used, usually resulting in a rotor housing that is designed primarily to withstand the thermal environment which results in a heavy, structurally inefficient rotor housing.

As can be seen, there is a need for an improved rotary engine housing that provides for a more structurally efficient design while maintaining the advantages of the rotary engine.

SUMMARY OF THE INVENTION

In one aspect of the invention, a rotary combustion engine is provided comprising a rotor housing having an intake and exhaust port and a trochoid shaped inner chamber. An igniter is configured to ignite a combustible material disposed in said chamber and a shaft is rotatingly positioned in the housing to extend through the chamber further having an eccentric within the chamber. A rotor is disposed on the eccentric and seals are disposed on the rotor to sealingly engaging the wall of the chamber as the rotor rotates about the shaft. An insert is disposed in the wall of the chamber, the insert is comprised of a material exhibiting low thermal conductivity. This type of low weight rotary combustion engine may be used in conjunction with a helicopter, airplane, boat, car, train, bus or truck.

In another aspect of the present invention, a thermal insert is provided configured for insertion into an internal wall of a rotary engine wherein the insert is comprised of a material exhibiting a lower thermal conductivity than the internal wall.

These and other features, aspects and advantages of the invention will become better understood with reference to the following drawings, description, and claims.

BRIEF DESCRIPTION OF THE DRAWING

FIG. 1A-1D are cross sectional views which show the rotary engine in various stages of a single rotation of the rotor;

DETAILED DESCRIPTION OF THE INVENTION

Figure 1B:
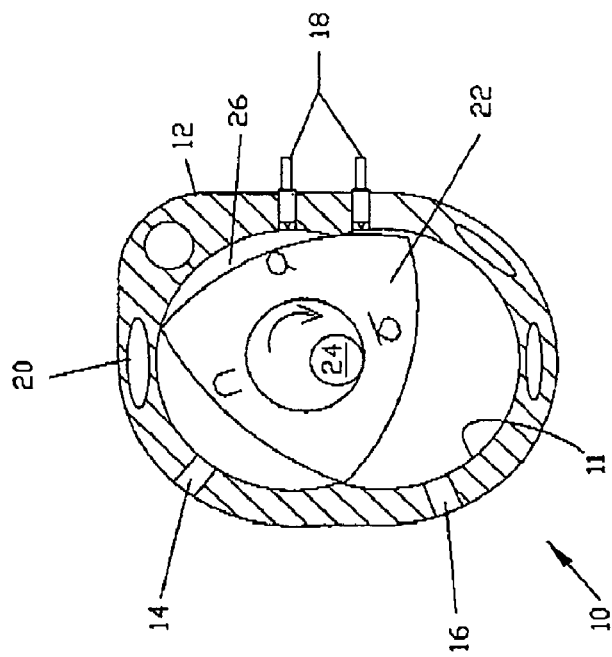

The following detailed description is of the best currently contemplated modes of carrying out the invention. The description is not to be taken in a limiting sense, but is made merely for the purpose of illustrating the general principles of the invention, since the scope of the invention is best defined by the appended claims.

Referring first to FIGS. 1A through 1D, the various stages of a single cycle of a typical rotary engine and the construction of typical rotary engine will be described so that the invention may be better understood. A Wankel rotary engine 10 is shown which comprises a rotor housing 12 having a trochoidal inner surface 11 wherein a somewhat triangular shaped rotor 22 is configured to rotate about a shaft 24. The rotor 22 has three faces, denoted 'a', 'b' and 'c'. Disposed at each vertex of the rotor 22 is an apex seal 15 which is configured to seal against the inner surface 11 as the rotor spins, Disposed on one side of the rotor housing 12 is an intake port 14 configured to allow a fuel/air mixture enter a intake chamber 25 that is formed between the trochoidal inner surface 11 and face 'a' of the rotor 22. Disposed on the same side of the rotor housing 12 as the intake port 14 is the exhaust port 16 that is configured to allow exhaust gases to escape from the inner volume of the rotor housing 12. A plurality of coolant passageways 20 are disposed inside the thick walls of the rotor housing 12.

The coolant passageways are arranged and configured to provide a flowing fluid for the removal of heat from the rotor housing 12 and to keep the rotary engine 10 operating at an acceptable temperature. A pair of igniters or spark plugs 18 are disposed through a wall of the rotor housing 12 and the spark plugs 18 are configured to ignite the pressurized fuel/air mixture at the appropriate time. FIG. 1A depicts the rotor face 'a' at the position in the cycle where the fuel/air mixture is introduced into the intake chamber 25.

Figure 1A:
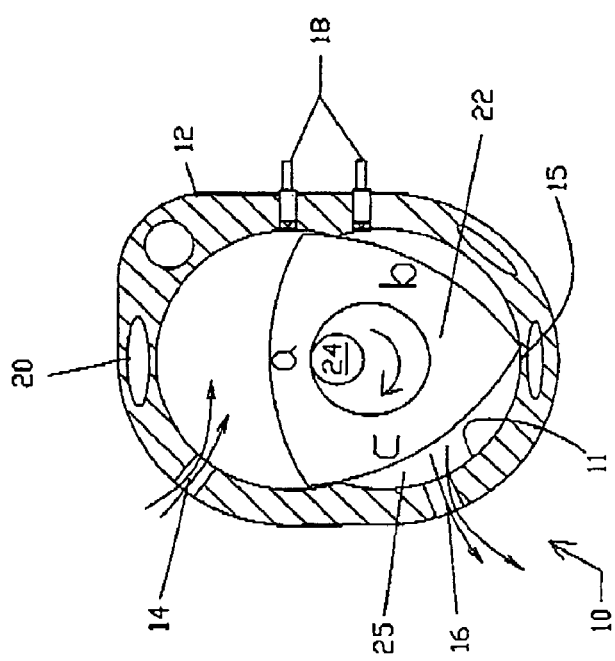

Now referring to FIG. 1B, the rotor 22 has rotated approximately 90 degrees counter-clockwise such that the fuel/air mixture that was introduced between the rotor face 'a' and the inner surface 11 has been compressed inside the compression chamber 26. FIG. 1C shows the rotor face 'a' has moved a little further in the clockwise direction to the point where the spark plugs 18 are fired and cause the fuel/air mixture to ignite inside the ignition chamber 28. Referring now to FIG. 1D, following ignition, the rotor face 'a' rotates approximately 90 degrees during the combustion of the fuel/air mixture forming the combustion chamber 30. Finally, the rotor face 'a' rotates another 90 degrees and expels the exhaust gases out of the exhaust port 16. At this point the rotor face 'a' begins the cycle all over again. It should be noted that this cycle occurs sequentially for each face of the rotor as it spins, so that by the time face 'a' returns to the point shown in FIG. 1A, there has been three (3) ignitions (one for each rotor face).

Figure 3:
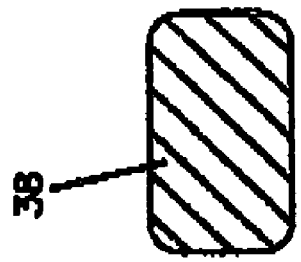
FIG. 3 is a cross-sectional view of the thick wall of a typical rotor housing in accordance with the prior art.
Figure 2:
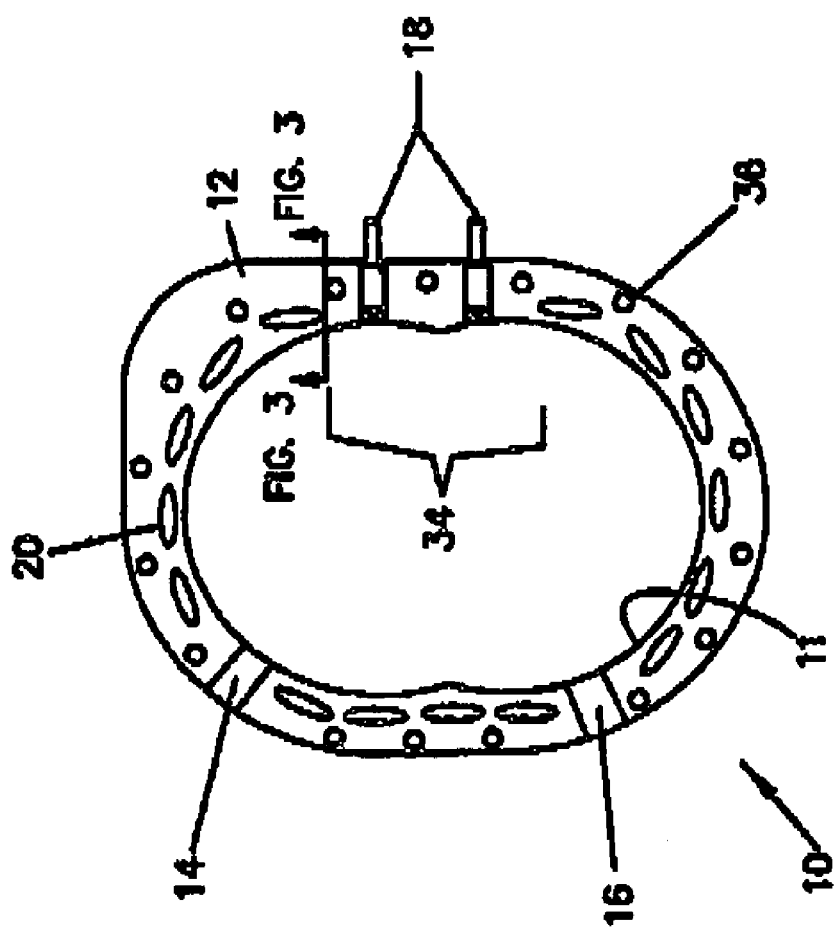
FIG. 2 is a simplified cross-sectional view of a rotary engine in accordance with the prior art.

Referring now to FIG. 2, which shows a simplified cross-sectional view of a rotary engine in accordance with the prior art. Typically, the rotor housing 12 is comprised of thick sections of aluminum due to aluminums high thermal conductivity which is required to manage the high surface temperatures in the hot zone 34. The hot zone 34 is adjacent the spark plugs 18 and the ignition chamber 28 and combustion chamber 30 as shown in FIGS. 1C and 1D respectively. Unfortunately, while aluminum may be a good material for heat transfer, it exhibits lower strength and fatigue properties, especially at elevated temperatures. Consequently, as shown in FIG. 3, the rotor housing 12 must employ thick walls 38 that are heavy and structurally inefficient. The use of high strength steels, or other materials with a high strength-to-weight ratio, to construct the rotor housing has heretofore been avoided due to their lower thermal conductivity properties.

Figure 4A:
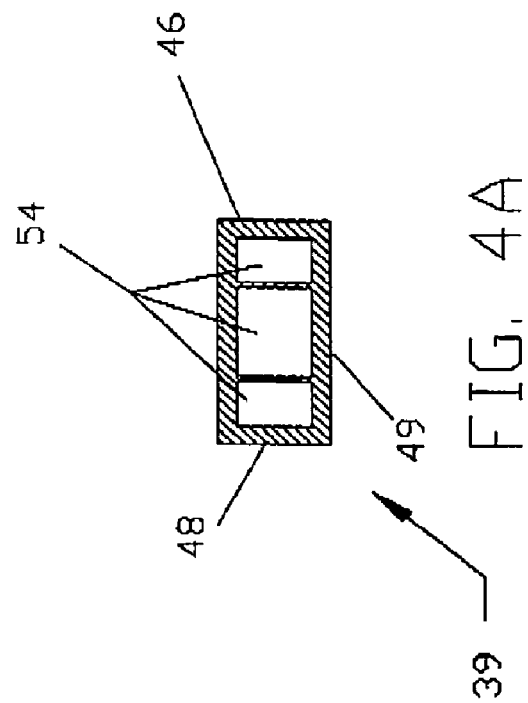
FIG. 4A is a cross-sectional view of the rotor housing wall in accordance with the invention.
Figure 4:
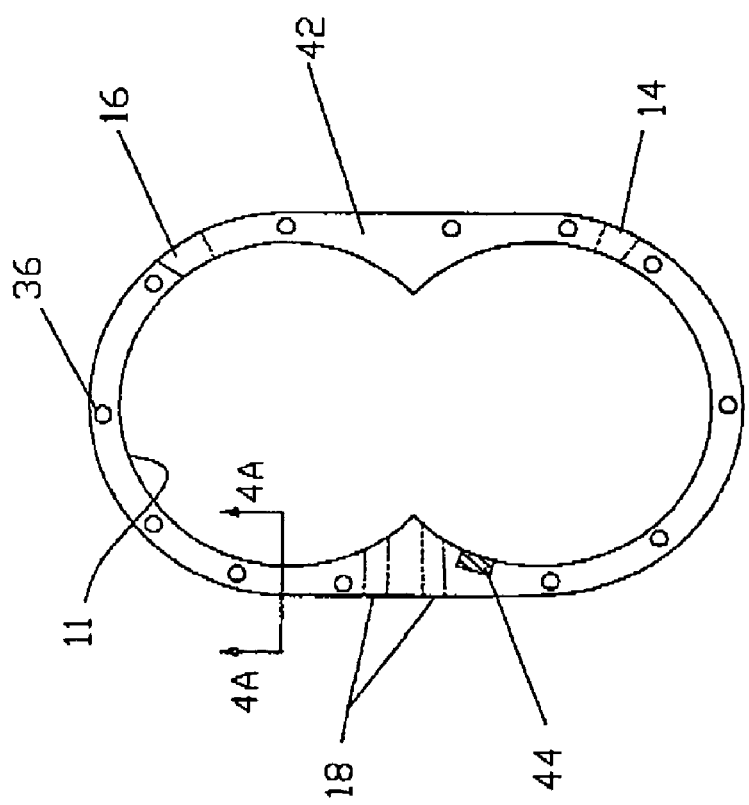
FIG. 4 is a front plan view of a rotor housing in accordance with the invention.

Referring now to FIG. 4, which shows a lightweight housing 42 in accordance with the invention. The lightweight housing 42 may be comprised of a high strength material such as steel or titanium and is comprised of thin walled structurally efficient cross-sections as shown in FIG. 4a. The use of the high strength material is made possible by the incorporation of a combustion zone thermal barrier insert 44 into the housing 42. The insert 44 may be comprised of zirconia or other similar material which exhibits a very low thermal conductivity thereby substantially reducing the transfer of heat into the housing 42. The insert 44 may be disposed on the inner surface 11 at a predetermined position and may be slightly recessed a predetermined amount from the surface 11, (approximately 0.001" for example) to eliminate any interference that may occur with the apex seals 15 as they slide by the insert 44. The insert 44 may also be placed in a location such that there is a low pressure differential across the apex seal 15 which ensures minimal seal leakage. A series of through holes 36 are provided along the periphery of the lightweight housing 42 to accept mounting/assembly bolts.

Referring again to FIG. 4A, which shows one possible cross-sectional arrangement of the lightweight housing 42. As shown, a thin-walled channel section 39 may now be possible which is comprised of a front flange 48, a rear flange 48, a wall section 49 and a pair of optional circumferential structural bands 54.

Figure 5:
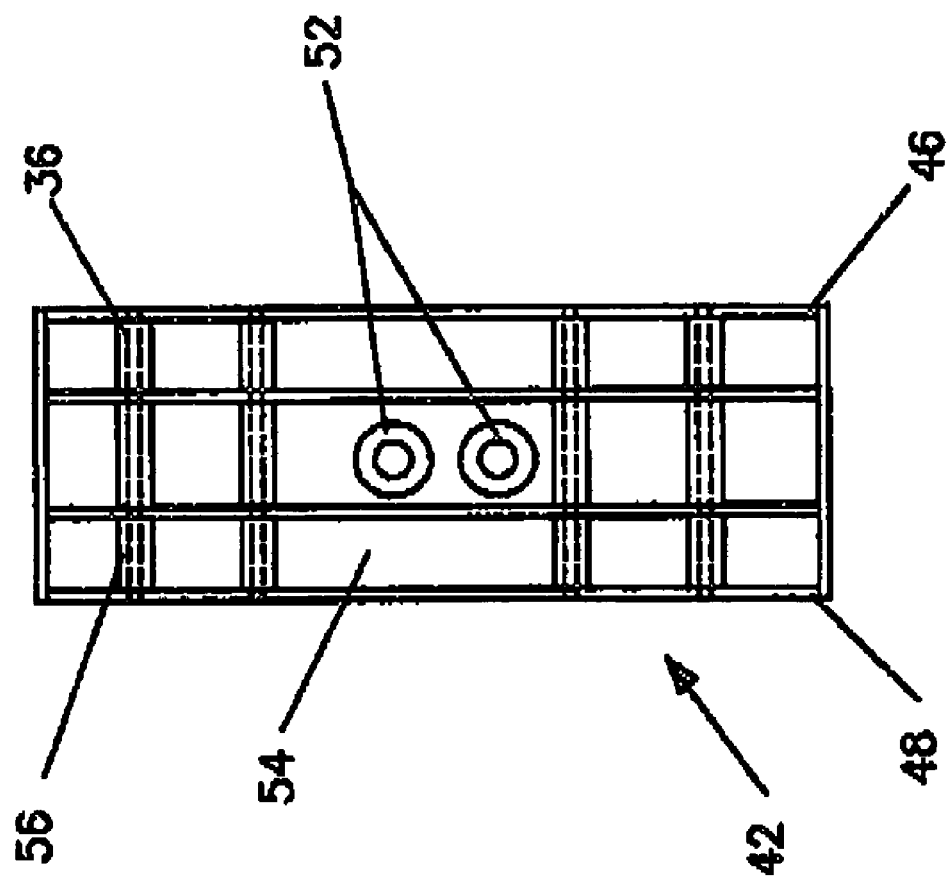
FIG. 5 is a side view of the rotor housing in accordance with the invention.

Referring now to FIG. 5, which shows a side view of the light weight rotor housing 42. A pair of spark plug bosses 52 configured to receive a typical igniter, glow plug or spark plug may be disposed on the wall section 49. A plurality of mounting hole bosses 56 may be disposed along the periphery of the housing and act as a means for attachment of the engine. This structurally efficient design results in a housing that may be approximately 50% of the weight of an aluminum housing. This may result in a 50% increase in power density and allow for higher combustion pressures which thereby allows for a higher power output for a given rotary engine size. In addition, due to steel and titanium's lower thermal expansion properties, the installation and clamping of the rotor housing may be significantly simplified. The use of the insert 44 may also allow for the use of a smaller and lighter heat exchanger.

The use of the insert 44 allows for the use of a housing material with lower thermal conductivity thereby allowing the designer to select a lighter more durable material that results in a less costly engine to produce. In addition, the use of the insert 44 may also extend the power range of the engine that requires only a simple air cooled system rather than the incorporation of a heavy and expensive liquid cooled system. Another advantage gained by the use of the insert 44 is the thermodynamic cycle of the rotary engine retains more of the heat and rejects less to the cooling system, thereby increasing overall engine efficiency and reducing the cooling system size and weight.

It should be understood, of course, that the foregoing relates to preferred embodiments of the invention and that modifications may be made without departing from the spirit and scope of the invention as set forth in the following claims. For example, while the figures depict the use of two spark plugs, any number of spark plugs or igniters would be possible. It should also be understood that a plurality of rotors could be arranged inline to produce a larger more powerful engine.

I claim:

1. A rotary combustion engine comprising:
    a thin walled rotor housing having an intake and exhaust port and a trochoid shaped inner chamber and a combustion chamber therein;
    an igniter configured to ignite a combustible material disposed in said chamber;
    a shaft rotatingly positioned in said housing to extend through said chamber and having an eccentric within said chamber;
    a rotor disposed on said eccentric;
    seals disposed on said rotor sealingly engaging the wall of said chamber as said rotor rotates about said shaft; and
    an insert disposed in the wall of said chamber, said insert comprised of a material exhibiting low thermal conductivity, wherein said insert is located in the combustion chamber of the rotary-engine and said insert is exposed directly to the combustible material to reduce the transfer of heat from combustion into said thin walled rotor housing.

2. The rotary combustion engine of claim 1, wherein said insert is comprised of zirconia.

3. The rotary combustion engine of claim 1 further comprising a cooling system disposed adjacent said rotor housing.

4. The rotary combustion engine of claim 3, wherein said cooling system is comprised of a liquid cooling system.

5. The rotary combustion engine of claim 3, wherein said cooling system is comprised of an air cooling system.

6. The rotary combustion engine of claim 1, wherein said combustible material is a fuel air mixture.

7. The rotary combustion engine of claim 1, wherein the engine is used in one selected from the group consisting of a helicopter, an airplane, a boat, a car, a train, a bus and a truck.

8. The rotary combustion engine of claim 1, wherein said igniter is a spark plug.

9. The rotary combustion engine of claim 1, wherein said igniter is a glow plug.

10. The rotary combustion engine of claim 1 further comprising a plurality of attachment means spaced along the periphery of said housing, said attachment means being configured to rigidly attach the engine.

11. The combustion rotary engine of claim 1, wherein said insert is recessed from the wall of said chamber a predetermined amount.

\* \* \* \* \*